(12) United States Patent
Thakare (10) Patent No.: US 8,311,030 B2
(45) Date of Patent: Nov. 13, 2012

(54) ENHANCED CELL SCANNING

(75) Inventor: Kiran Thakare, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1133 days.

(21) Appl. No.: 12/187,912

(22) Filed: Aug. 7, 2008

(65) Prior Publication Data

US 2009/0227255 A1    Sep. 10, 2009

Related U.S. Application Data

(60) Provisional application No. 61/035,156, filed on Mar. 10, 2008, provisional application No. 61/035,942, filed on Mar. 12, 2008.

(51) Int. Cl.
*H04J 3/06* (2006.01)

(52) U.S. Cl. .......................................... 370/350; 455/434

(58) Field of Classification Search ........................ None
See application file for complete search history.

(56) References Cited

U.S. PATENT DOCUMENTS

| | | | |
|---|---|---|---|
| 7,471,942 B2 * | 12/2008 | Subramanian et al. | 455/343.2 |
| 7,937,100 B2 * | 5/2011 | Kim et al. | 455/509 |
| 7,953,365 B2 * | 5/2011 | Lim et al. | 455/11.1 |
| 2003/0157949 A1 | 8/2003 | Sarkkinen et al. | |
| 2005/0096053 A1 | 5/2005 | Liu et al. | |
| 2005/0272403 A1 * | 12/2005 | Ryu et al. | 455/403 |
| 2007/0064666 A1 * | 3/2007 | Kwun et al. | 370/343 |
| 2007/0178898 A1 | 8/2007 | Kim et al. | |
| 2009/0175372 A1 * | 7/2009 | Moon et al. | 375/260 |

FOREIGN PATENT DOCUMENTS

EP    1 530 385    11/2005

OTHER PUBLICATIONS

International Search Report and Written Opinion mailed Feb. 19, 2009 in corresponding PCT Application PCT/SE2008/051219.
"Part 16: Air Interface for Fixed and Mobile Broadband Wireless Access Systems", IEEE Std 802.16e™-2005 and IEEE Std 802.1634-2004/Cor1-2005, Feb. 28, 2006.
"A method of Shortening the Duration of Scanning Neighbor BSs", IEEE 802.16 Broadband Wireless Access Working Group http://ieee802.org/16, Aug. 17, 2004.
WiMAX Forum™ Mobile System Profile Release 1.0 Approved Specification (Revision 1.4.0: May 2, 2007).

* cited by examiner

*Primary Examiner* — Nittaya Juntima
*Assistant Examiner* — Rhonda Murphy
(74) *Attorney, Agent, or Firm* — Nixon & Vanderhye P.C.

(57) ABSTRACT

Cell scanning operations are enhanced making them more time and power efficient. A base station communicates with mobile radios in a cellular communication system. The base station transmits in a cell a known symbol sequence over a broadcast channel to permit mobiles to detect and synchronize to the base station. It transmits a time indicator indicating when the base station will transmit service information from which a mobile may determine whether the base station can provide a desired communications service. After a time period associated with the time indicator, the base station transmits the service information. A mobile radio in or near the cell scans for and detects the broadcast signal. A decoder in the mobile decodes the broadcast signal and detects a time period associated with receiving the broadcast information. Based on the time period, the decoder halts further decoding of the broadcast signal. Later, the decoder resumes decoding of the broadcast signal in accordance with the time period and acquires the broadcast information from the broadcast signal.

44 Claims, 8 Drawing Sheets

Fig. 1

ASN: Access Service Network
CSN: Connectivity service network
NSP: Network service provider
NAP: Network access point
GW: Gateway
BS: Base Station
MS: Mobile Station
IMS: IP Multimedia System

ENHANCED CELL SCANNING

PRIORITY APPLICATION

This application is claims priority from U.S. provisional patent application Ser. No. 61/035,156, filed on Mar. 10, 2008, entitled "Enhanced Cell Scanning," and U.S. provisional patent application Ser. No. 61/035,942, filed on Mar. 12, 2008, entitled "Enhanced Cell Scanning," the contents of which are incorporated herein by reference.

TECHNICAL FIELD

The technical field relates to cellular radio communications, and more particularly, to cell scanning.

BACKGROUND

In a cellular radio communications system, mobile radio stations communicate with one or more base stations over an air or radio interface. Communication links between mobile subscribers and base stations should be established quickly, and handover of a mobile connection between base stations should be performed rapidly, without errors, and without inadvertently dropping the call or losing a communication link. These objectives are accommodated by the mobile station scanning signals broadcast from nearby base stations. Scanning is analogous to "listening" to neighboring base stations to determine which base station to "camp on" if the mobile is not involved in an active connection and to determine whether handover of an active connection with the mobile station to another base station should occur.

Scanning can be both time consuming and power consuming. A mobile station must repeatedly scan many base stations both while it is in an idle state and when it is involved in an active connection. For each scan of a broadcast from a base station in an associated cell, the mobile must tune to the frequency of the broadcast, determine a signal strength and/or signal quality of the broadcast signal, acquire frequency and time synchronization with the broadcast, and decode the broadcast information which often includes various system and cell-specific information. From the decoded broadcast information, the mobile station can determine whether it is permitted to obtain any kind of service from this cell, i.e., the cell is not a "forbidden" cell, and if so, whether the cell offers the kind of service the mobile station wants. Some example services include: a cell may only provide limited resources on the uplink and/or downlink for acquiring a video service; a cell may not support the mobile station's power profile or multi-broadcast service zone; or a cell may not provide certain handovers. These scanning related operations consume the limited battery resource that powers the mobile station.

Most broadcast signals are transmitted as a series of frames, each frame having a known signal called a preamble used by mobile stations for synchronization. Each frame also has other basic synchronization information about the cell. However, service information required to obtain the service from the cell is broadcasted less frequently. In some situations, the time period between service information transmissions may be very long. As a result, the mobile station may have a significant time period after it has synchronized to the base station broadcast before it receives that service-related information. This makes the scanning process both time and power inefficient.

SUMMARY

The technology in this application enhances cell scanning operations to make them more time and power efficient. A base station communicates with mobile radio devices in a cellular radio communication system. The base station transmits in a cell a known symbol sequence over a broadcast channel to permit mobile radios to detect and synchronize to the base station. It transmits a time indicator indicating when the base station will transmit service information from which a mobile radio may determine whether the base station can provide a desired communications service. After a time period associated with the time indicator, the base station transmits the service information. The time indicator may be constructed in the base station or in a node communicating with the base station.

The service information may include system information and cell-specific information. Example information includes a network identifier identifying a operator to which the base station belongs, a base station identifier, information on how to obtain uplink access, supported frequency bands, a transmit power profile, and a paging area identifier.

In one non-limiting embodiment, the known symbol sequence is a preamble provided in a frame of information transmitted by the base station. The frame further includes a frame control header, and each frame includes the preamble and the frame control header. The time indicator is included in the frame control header. Only periodic ones of the frames include the service information.

In a non-limiting example embodiment, the cellular radio communication system supports one or more IEEE 802.16 standards, and in this example, the service information is included in a downlink channel descriptor (DCD)/uplink channel descriptor (UCD). The time indicator is a DCD/UCD offset defining an offset from a current time to the next time the base station will transmit the DCD/UCD. In one example implementation, the time indicator includes a bit to indicate whether a DCD/UCD offset is included in the current frame and multiple other bits to define the DCD/UCD offset amount if a DCD/UCD offset is included in the current frame. In another example implementation, the time indicator includes multiple bits to define the DCD/UCD offset amount if a DCD/UCD offset is included in the current frame. In another example implementation, the frame control header includes frame number and frame duration information in addition to the DCD/UCD offset. In yet another example implementation, the time indicator is included in a downlink media access protocol (MAP) portion of the frame. In this context, the time indicator may be included in a synchronization field in the downlink MAP portion of the frame or as a separate information element in the downlink MAP portion of the frame.

A mobile radio device in or near the cell scans for and detects the broadcast signal from a base station. A decoder in the mobile decodes the broadcast signal and detects a time period associated with receiving broadcast service information from the base station from which the mobile radio devices may determine whether the base station can provide a desired communications service. Based on the time period, the decoder halts further decoding of the broadcast signal. Later, the decoder resumes decoding of the broadcast signal in accordance with the time period and acquiring the broadcast information from the broadcast signal.

In the non-limiting example IEEE 802.16 standard embodiment, the known symbol sequence is a preamble provided in a frame of information transmitted by the base station. The mobile synchronizes with the base station using the preamble.

In a non-limiting example embodiment, the mobile moves to a battery conserving state for at least a portion of time after halting decoding of the broadcast signal. The mobile leaves the battery conserving state to a more active state to resume decoding of the broadcast signal at a time when the broadcast information is expected to be received by the mobile radio. Alternatively or in addition, after halting decoding of the broadcast signal, the mobile may scan and detect one or more other base station signals broadcast by one or more other base stations, and then resume decoding of the broadcast signal at a time when the broadcast information is expected to be received by the mobile radio. Ultimately, the mobile radio selects one of the base stations to obtain the desired communications service.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs and/or FPGA (Field Programmable Gate Array).

Figure 1:
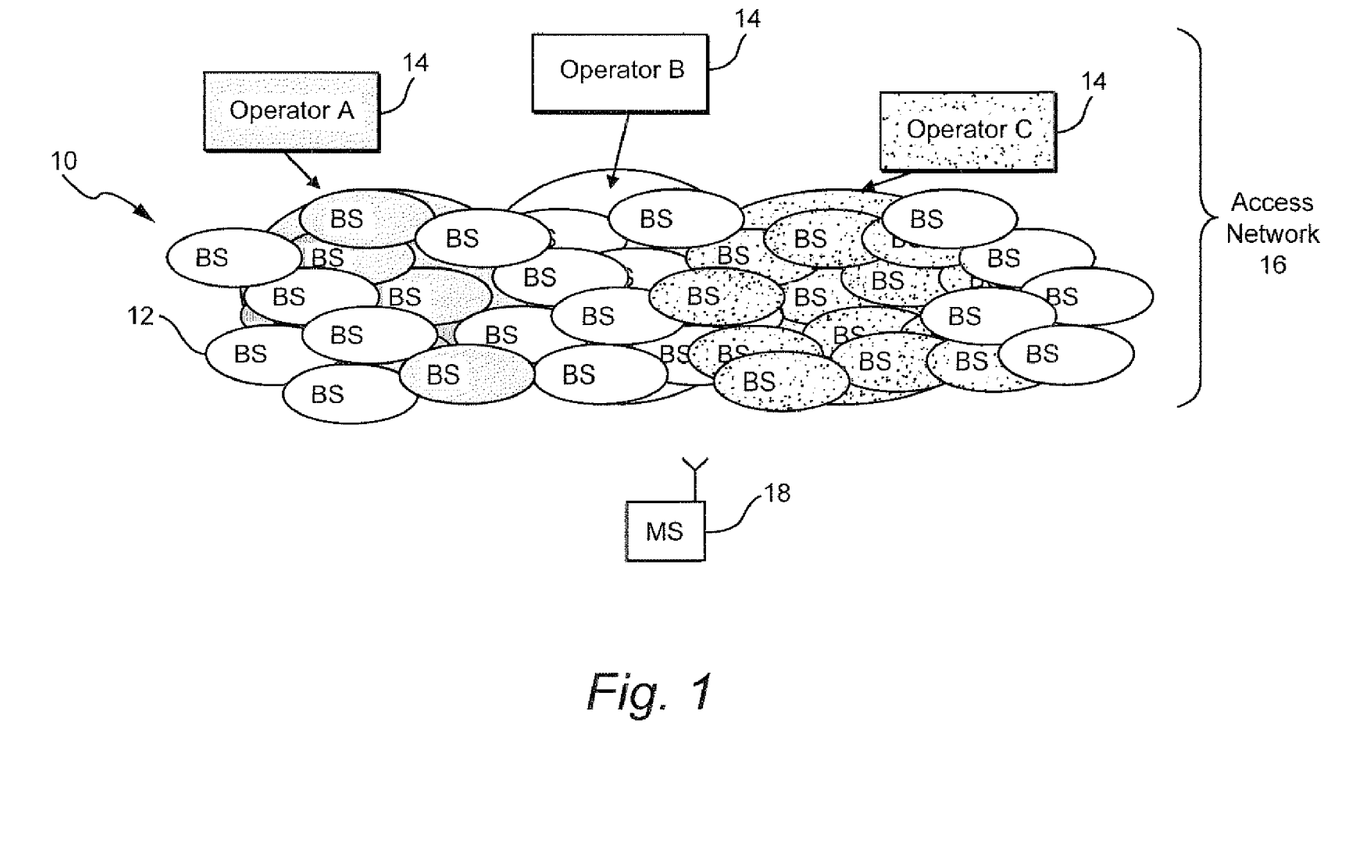
FIG. 1 illustrates an example of a cellular communications system.

The technology may be used in any type of cellular communications. FIG. 1 illustrates an example of a cellular communications system 10. For ease of description, the term mobile radio or mobile station is used and encompasses any kind of radio communications terminal/device like user equipment (UE), PDAs, cell phones, laptops, smart devices, etc. In the cellular communication 10, there are multiple cell areas 12 which are associated with a radio base station (BS). Collectively, the cells 12 form an access network 16 that provides services to a mobile station (MS) 18. the cells be associated with one more network operators 14. For the example shown in FIG. 1, there are three different operators A, B, and C, and each operator owns and operates various ones of the cells 12, as indicated by the respective shading. Of course, there could be only one operator or a different number of operators.

Each base station transmits information over the air or radio interface in one or more corresponding coverage areas called cells over a variety of downlink radio channels. Each base station also receives uplink communications over the air interface from mobile radios 22 in or near the base station's cell(s) using one or more uplink channels. One of the downlink channels is a broadcast channel over which the base station transmits broadcast information that includes service information from which a mobile radio may determine whether the base station can provide a desired communications service. For example, the service information may include system information and cell-specific information. Examples of these kinds of information include: a network identifier identifying a network to which the base station belongs, a base station identifier, information for sending uplink communications from a mobile radio to the base station, supported frequency bands, a transmit power profile, and/or a paging area identifier.

Figure 2:
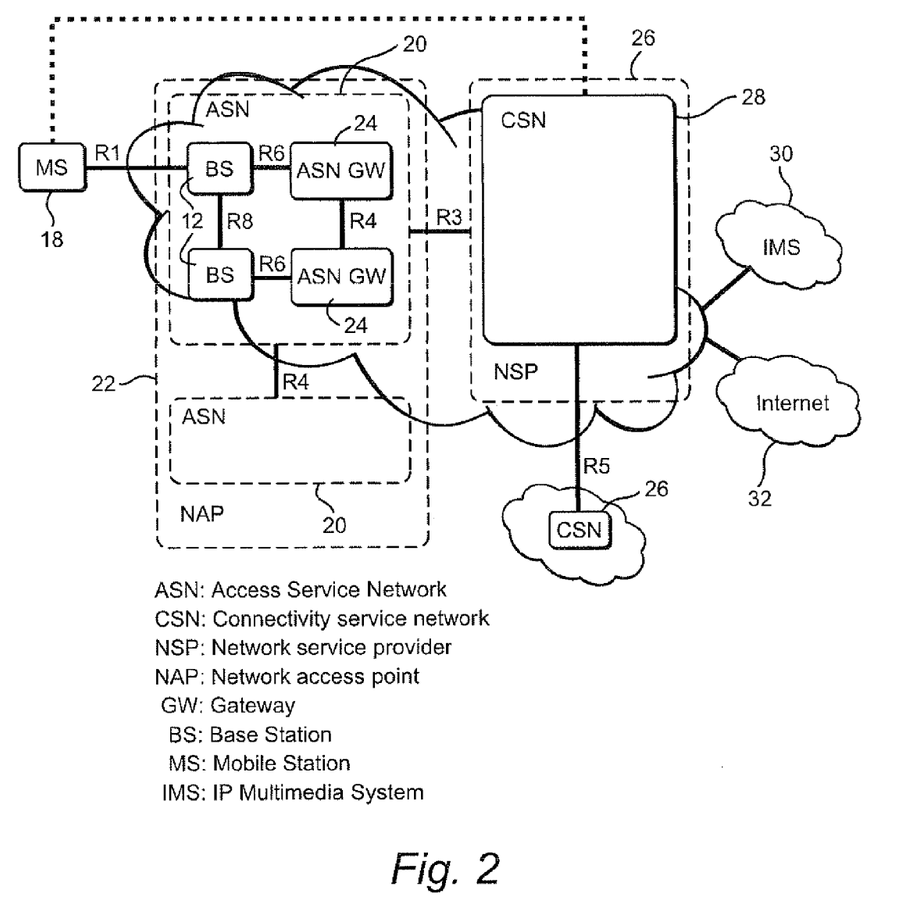
FIG. 2 is a non-limiting function block diagram of an 802.16 type of cellular communications system.

FIG. 2 is non-limiting function block diagram of an 802.16 type of cellular communications system, commonly referred to as a WiMAX type of system. A non-limiting example embodiment is presented in this context, but the enhanced cell scanning technology described may be applied to any modern cellular system. A mobile station (MS) 18 is connected over an air interface R1 to a base station (BS) 12 included in an access service network (ASN) 20. The ASN 20 may include multiple base stations 12 which may communicate over an R8 interface. Each base station also communicates with an ASN gateway (ASN GW) 24 over an R6 interface. The ASN GW's 24 may communicate over an R4 interface. Multiple access service networks also communicate over an interface R4 and are collectively included in a network access point (NAP) 22. The ASN 20 communicates with a connectivity service network (CSN) 28 over an interface R3. The CSN 28 is part of a network service provider (NSP) 26. Different connectivity service providers 26 may communicate over an interface R5 and/or with an IP multimedia system (IMS) 30 and/or the Internet 32. Again, although this non-limiting example is used for purposes of illustration in the description below, and the technology in this application may be applied to other modern cellular systems such as second generation (2G) and third generation (3G) cellular systems.

When a mobile station wants to join a WiMAX network (see e.g., IEEE 802.16e Standards R2/D2 incorporated herein by reference), it follows network entry procedures as specified in the WiMAX Profile incorporated herein by reference. During the network entry/cell reselection process, the mobile station scans possible base station broadcast channels of the downlink (DL) frequency band of operation in the defined frequency list. The MS senses the energy on the carrier frequencies using frequency steps to acquire a base station's DL broadcast channel. On finding a DL channel, the MS then acquires the preamble of a frame transmitted on that DL channel by reading binary phase shift keying (BPSK) tones known by the MS. Any type of known signal or sequence of symbols may be used as a preamble. The tones carried in the preamble uniquely identify one base station from another as well as one BS sector from another. Thus, the preamble allows the mobile station to acquire the synchronization with a cell's broadcast signal.

After synchronization with the preamble, the mobile station reads a frame control header (FCH) which follows the preamble. In the 802.16e example, the FCH contains a DL Frame Prefix (DLFP) which provides frame configuration information, such as the modulation and coding scheme, the length of one or several DL burst immediately following the FCH, and the usable orthogonal frequency multiple access (OFDM) sub-carriers. This information is used to decode a Downlink and Uplink Media Access Protocol (DL MAP/UL MAP) portion of the frame and a Downlink Channel Descriptor (DCD)/UL Channel Descriptor (UCD), if the DCD/UCD is present in this frame. The DCD/UCD is not present in every frame.

The DCD contains desired service information such as frequency, paging group ID, BS ID, operator ID, transmission node (TDD/FDD), access information (frame, frame duration, TTG/RTG gaps, power control, media access control (MAC) version, handover (HO) support parameters which include hysteresis margin, time to trigger, trigger type, handover capability information, multi-broadcast service (MBS) zone, etc. The UCD contains UL system access information such as ranging parameters, modulation profile, power profile, available resources for various services, etc.

Figures 3, 4:
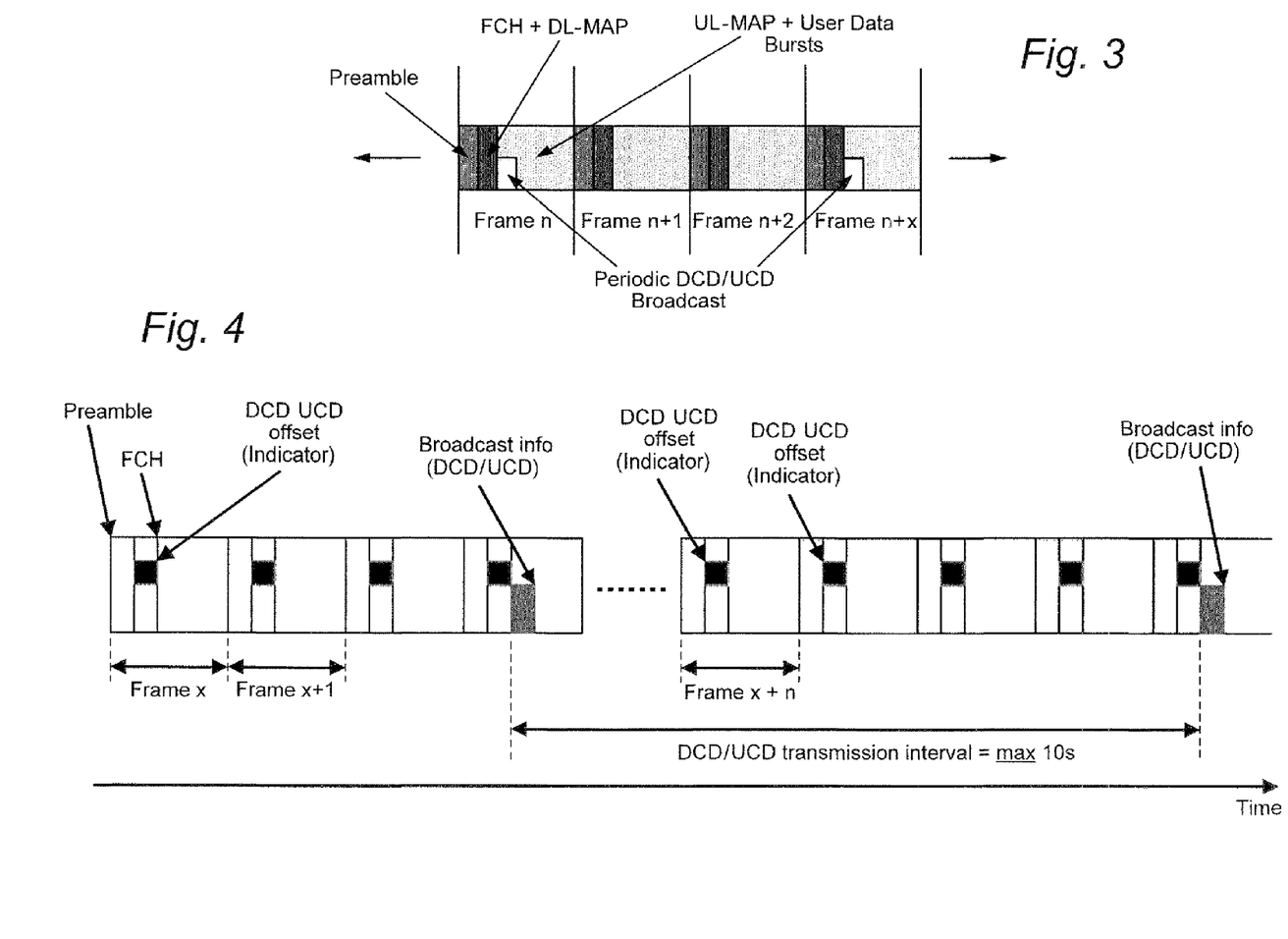
FIG. 3 is a diagram of showing a sequence of frames broadcast by a base station using a frame format that may be used in an 802.16 type cellular communications system.
FIG. 4 is diagram of showing a sequence of flames broadcast by a base station using a modified frame format from that shown in FIG. 3 to include a DCD/UCD offset indicator.

The DCD/UCD broadcast the cell's desired service information (e.g., system and cell-specific information) only periodically and less frequently. One non-limiting example of a frame format that may be used in an 802.16 type cellular communication system is depicted in FIG. 3 for purposes of illustration. Each frame includes a preamble portion, a frame control header portion, a downlink-media access protocol (MAP) portion, an uplink-MAP and user data burst portion. Periodic frames include downlink channel descriptor (DCD)/uplink channel descriptor (UCD) broadcast information which includes the broadcast service information that scanning mobile radios are looking for. In the example in FIG. 3, the period is identified as time "x". The IEEE 802.16e standards R2/D2 designate that the maximum value of the time between two consecutive DCD/UCD messages is 10 seconds. This significant "wait" period has a number of disadvantageous as described in the background including a considerable drain on battery power of the mobile station, delays in scanning other base stations, considerable delays (in tens of seconds) in accessing a desired service from the cell. All of these disadvantages undermines the quality of service perceived by the end user. After decoding the DCD/UCD, the mobile station further monitors the DL MAP/UL MAP to acquire and maintain the synchronization at the MAC level.

A mobile station engaged in an active call or doing the initial entry to the network needs to performs repeated scanning to maintain/acquire the connectivity to the network. The BS that supports mobility functionality may include a mobile neighbor advertisement MOB-NBR-ADV message in the DCD at a periodic interval. The MOB-NBR-ADV message provides the scanning mobile with neighboring cell characteristics for cell selection or handover. The nominal time between the transmissions of MOB-NBR-ADV messages might be as high as 30 s in the current WiMAX Profile.

The serving BS may send the MOB-NBR-ADV messages to the mobile station with a selected list of neighboring BSs to scan. The serving BS may additionally schedule the scanning interval for the mobile station to conduct the scan, thereby sacrificing the end user quality. Assume, for example, the mobile station begins scanning a neighbor BS1. First, the mobile station must synchronize with BS1 by decoding its preamble, decoding the FCH, and then the DL MAP. The mobile station then must wait for the DCD/UCD message to show up, which may take up to 10 seconds. If the neighbor cell list contains large number of BSs, then the mobile station must sequentially scan all these base stations, each requiring the mobile station to lock to BS up to 10 s or more to fully receive and decode the DCD/UCD message. Thus, acquiring the desired service information in the DCD/UCD message of each BSs may often take too long. For ten BSs, a worst case in this example might be on the order of 100 seconds.

Reducing the number of BSs to scan (for a mobile station contemplating a HO) may resolve the issue to some extent, but it does not fully resolve it. For example, shortening the list BSs to scan may not be feasible in all deployment scenarios (especially in a dense urban deployment). For a high-speed moving mobile, this list changes very frequently, increasing the system overhead due to a requirement of updating the list almost every couple of frames. Additionally the problem remains for the mobile station initially entering the network of having to scan a number of BSs. Although a BS might increase the periodicity of the DCD/UCD messages, this adversely increases overhead and consumes precious radio resources. Thus, network entry performance and the handover performance of the WiMax system are degraded and scanning operations consume too much battery power.

The technology described in this application reduces the time that the mobile station must wait to acquire periodically transmitted, desired service broadcast information, e.g. the DCD/UCD message in WiMAX. FIG. 4 is a diagram illustrating a solution to these problems in the context of the non-limiting example shown in FIG. 3. Specifically, FIG. 4 shows a sequence of frames broadcast by a base station using a modified frame format from that shown in FIG. 3 to include a DCD/UCD offset indicator. That indicator in this example is included in the FCH portion of each frame and indicates a time period or frame offset in which the broadcast information in the DCD/UCD will be transmit. In this non-limiting example, the time offset may range between 0 and 10 seconds. Once the mobile station has decoded and synchronized to the preamble of the frame and decoded at least enough of the FCH to read the DCD/UCD offset indicator, the mobile station can make a decision whether to wait until the DCD/UCD broadcast information is transmitted, go to sleep to save battery power, scan other base stations, and/or perform some other activity or task. For example, if the DCD/UCD-offset value is relatively large, then the mobile station can go away and scan other BSs. If the DCD/UCD transmission is just couple of frames away, depending upon its channel acquisition time, the MS locks (waits) on this BS and then decodes the DCD/UCD message. Thus, the waiting duration is considerably reduced resulting in a shorter scanning duration and reduced battery consumption.

Figure 5:
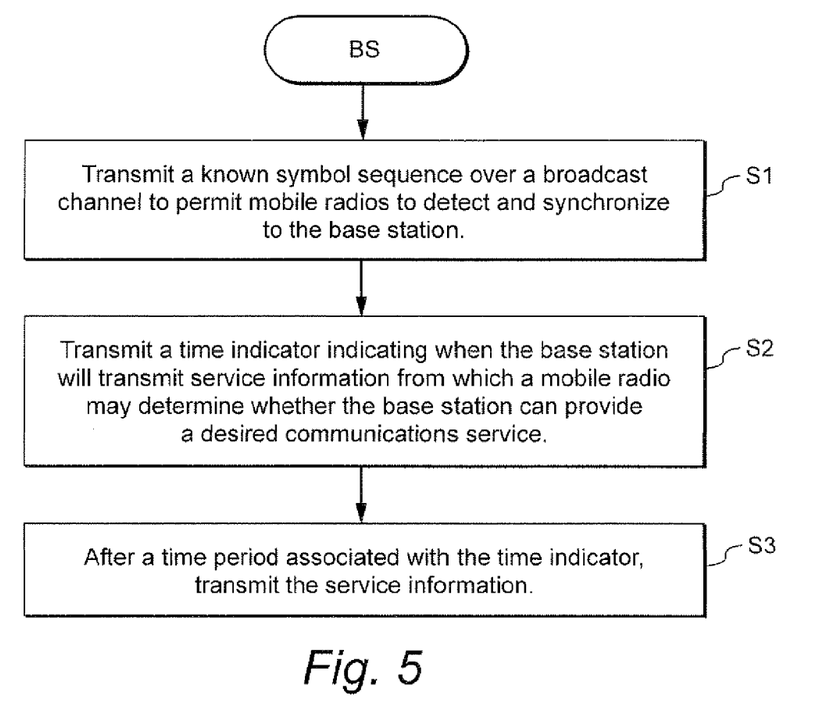
FIG. 5 is a flow chart illustrating non-limiting example procedures that may be performed by a base station relating to transmitting a time indicator indicating when the base station will transmit certain service information.

FIG. 5 is a flowchart diagram illustrating non-limiting example procedures that may be performed in more general terms by a base station relating to transmitting a time indicator indicating when the base station will transmit certain service information. The base station transmits a known symbol sequence over a broadcast channel to permit mobile radios to detect and synchronize to the base station (step S1). The base station then transmits a time indicator indicating when the base station will transmit service information from which a mobile radio may determine whether the base station can provide a desired communication service (step S2). After a time period associated with the indicator, the service information is then transmitted by the base station (step S3).

Figure 6:
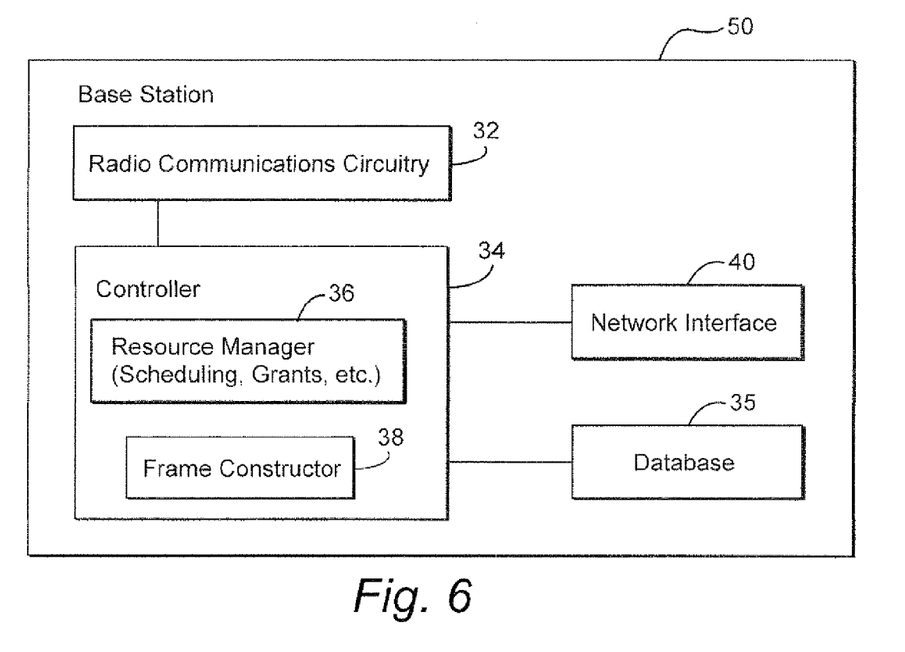
FIG. 6 is a non-limiting function block diagram of a base station.

FIG. 6 is a non-limiting function block diagram of a base station that may be used to implement the non-limiting procedures illustrated in FIG. 5. The base station 50 includes radio communication circuitry 32 coupled to a controller 34. The controller 34 is also coupled to a database 35 and to a network interface 40 for communication with the radio access and/or other network(s). The controller 34 includes a resource manager 36 that may be used for scheduling transmissions, grants, etc. In one implementation, a frame constructor 38 constructs frames in accordance with an appropriate frame protocol/format. In particular, the frame constructor 38 constructs frames that include a time indicator indicating when the base station will transmit service information from which the mobile radium may determine whether the base station can provide a desired communication service, e.g., a DCD/UCD offset indicator in the example shown in FIG. 4.

Figure 7:
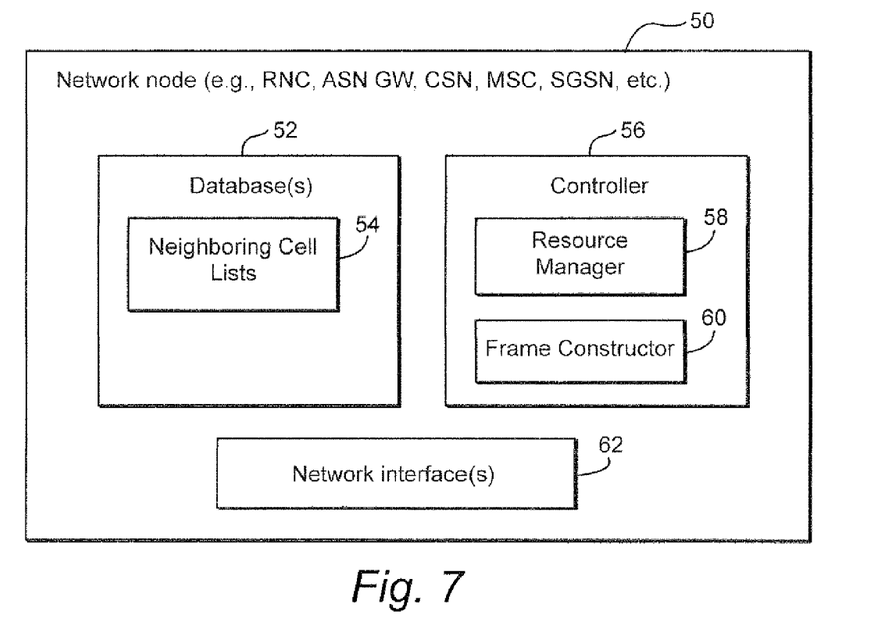
FIG. 7 is a non-limiting function block diagram of a network node.

Although the frames may be constructed in the base station and then forwarded to the radio communications circuitry 32 for broadcast transmission in an appropriate cell, the frames may also be constructed in some other node. FIG. 7 is a function block diagram of a non-limiting example of such a network node 50. Example network nodes include a radio network controller (RNC), and ASN GW, a CSN, a mobile switching center (MSC), an SGSN, etc. Depending on the type of network node, node 50 may include one ore more data bases 52 to store subscriber and/or cell information. The example in FIG. 7 includes neighboring cell lists 54. A controller 56 may include an overall resource manager 58 and a frame constructor 60 for constructing frames to include the time indicator, e.g., the DCD/UCD offset indicator. The controller is coupled to network interface(s) 62 for communication with radio access or other networks.

Figure 8:
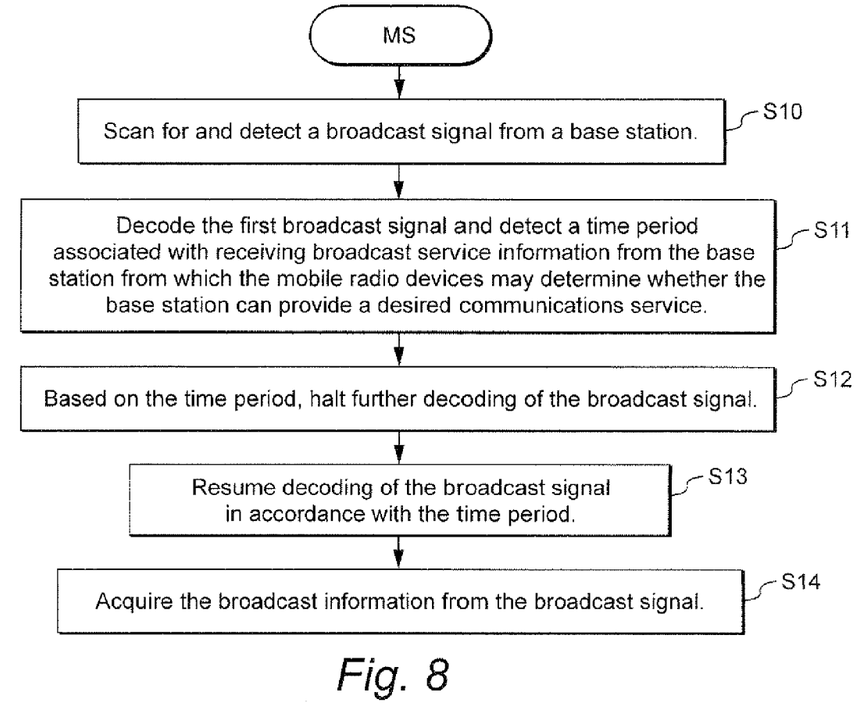
FIG. 8 is a flow chart illustrating non-limiting example procedures that may be performed by a mobile station relating to receiving a time indicator indicating when the base station will transmit certain service information.

FIG. 8 is a flowchart illustrating non-limiting example procedures that may be performed by mobile station relating to receiving a time indicator indicating when the base station will transmit certain service information. The mobile station scans for and detects a broadcast transmission from a base station (step S10). A decoder in the mobile station decodes the broadcast signal and detects a time period associated with receiving the broadcast service information from the base station from which the mobile station may determine whether the base station can provide a desired communication service (step S11). Based on the time period, a controller in the mobile station halts further decoding of the broadcast signal (step S12). Decoding of the broadcast signal resumes in accordance with (e.g., after expiration of) the time period (step S13). The mobile station then acquires the first broadcast information from the broadcast signal (step S14). Ultimately, the mobile station selects one or more of multiple scanned base stations that can provide the desired communications service, e.g., the one with the strongest received signal strength, to camp-on or to add to all active handover candidate list, etc.

Figure 9:
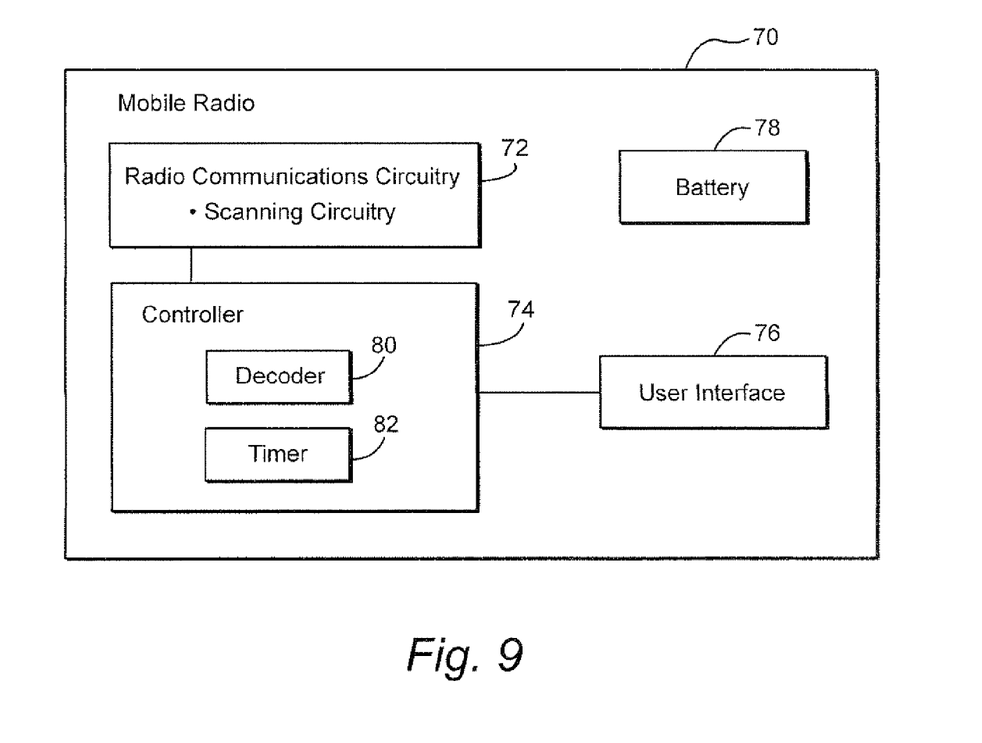
FIG. 9 is a non-limiting function block diagram of a mobile station.

FIG. 9 is a non-limiting function block diagram of a mobile station 70 that may be used to implement the procedures outlines in FIG. 8. Radio communications circuitry 72 is provided and includes among other things base station broadcast signal scanning circuitry. The radio communication circuitry 72 is coupled to a controller 74. The controller 74 is also coupled to a user interface 76 (e.g., a speaker, microphone, keypad, touch pad, display, etc.) for communication with the user. The communication circuitry 72 receives base station broadcast signals provided to a decoder 80 in the controller 74. The decoder 80 synchronizes to the broadcast signal and decodes the broadcast information. Based on timing indicator decoded, the controller 74 can set a time or count value in a timing circuitry 82 that is associated with a time or frame when the broadcast service information can be expected to be received from the base station. If that time interval is long enough, the mobile radio 70 can move into a power saving "sleep" mode to conserve the power of the battery 78 which powers the mobile radio 70. Alternatively, the scanning circuitry may be directed by controller 74 to scan other base station broadcast frequencies while the timing circuitry 82 times/counts.

Figure 10:
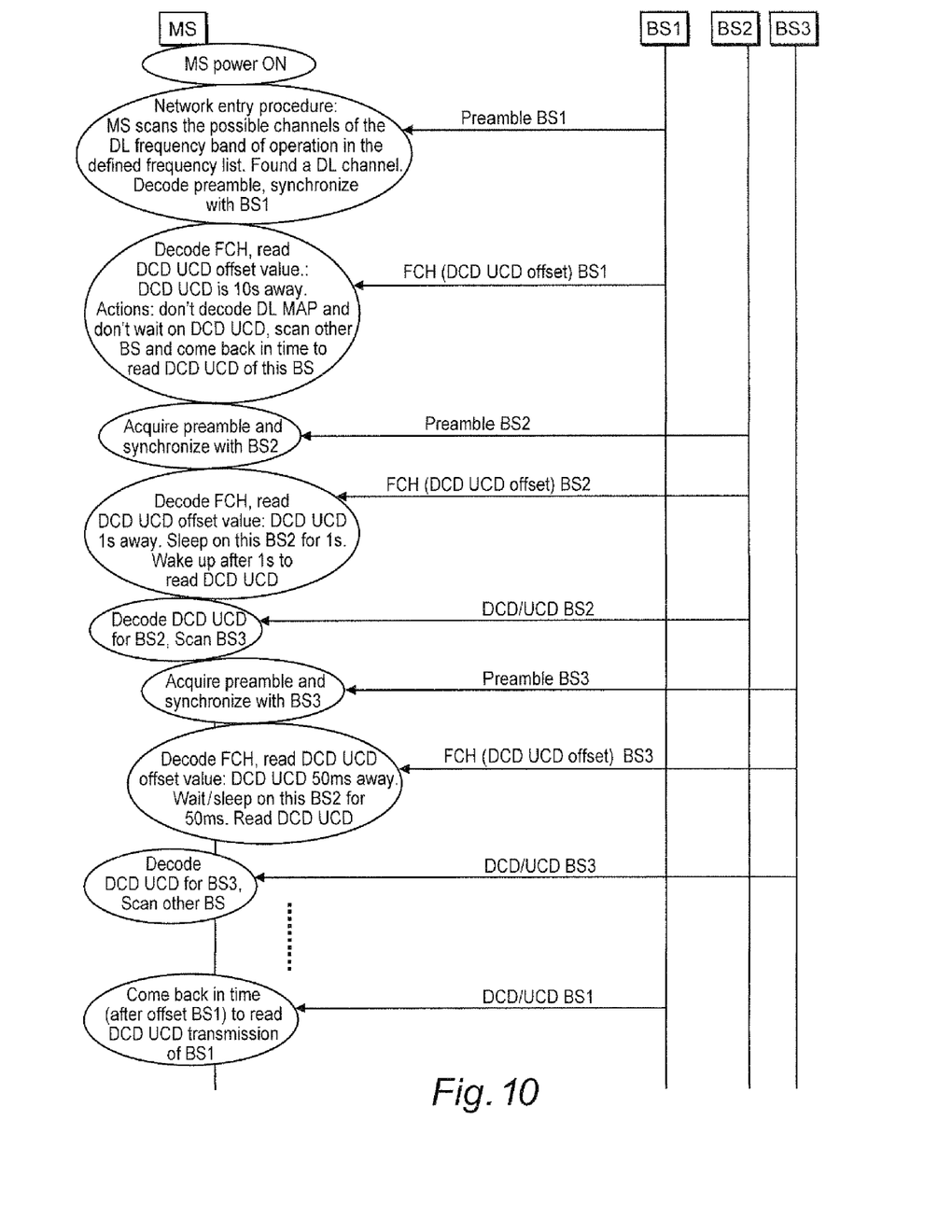
FIG. 10 is a non-limiting signaling flow diagram in the context of a 802.16 type cellular communications system.

FIG. 10 is a non-limiting signaling flow diagram in the context of an 802.16e type cellular communications system that represents signals exchanged between a mobile stations and various scanned base stations various operations performed by the mobile station. The mobile station (MS) powers-on and is within range of broadcast signals transmitted by three base stations BS1, BS2, and BS3. As part of an established network entry procedure in accordance with 802.16e, the mobile station scans the possible channels of the downlink frequency band of operation in a defined DL frequency list. The mobile station finds a downlink broadcast channel and decodes the preamble of one or more frames on that channel to synchronize with base station BS1. The mobile station then decodes the frame control header (FCH) and reads the DCD/UCD offset value. In this example, that offset value happens to be 10 seconds, which is a relatively long time to wait. The mobile station determines in this example not to wait for the DCD/UCD information and ceases decoding the frame. Instead, the mobile decides to scan other base stations and will come back to the BS1 broadcast based on the indicator just in time to read the DCD/UCD message transmitted by the base station BS1.

The mobile station then acquires the preamble broadcast by and synchronizes with base station BS2 based on frames received over the broadcast channel associated with BS2. The mobile decodes the BS2 frame control header, reads the DCD/UCD offset value, and determines that the DCD/UCD message is only 1 second away. The mobile station determines that this is close enough to wait for and goes to "sleep" for 1 second to save power. After 1 second, the mobile station wakes up to read the DCD/UCD message from base station BS2 and then moves on to scan the broadcast channel of base station BS3.

After acquiring the preamble and synchronizing with BS3 broadcast transmissions, the mobile station decodes the frame control header (FCH), reads the DCD/UCD offset value of 50 milliseconds, decides to wait to receive this value, and goes to sleep for 50 milliseconds. The 50 milliseconds is put into the counter/timer 82. The mobile wakes up after 50 milliseconds when the time expires to read the DCD/UCD of base station BS3, and goes on to scan other base stations. The timer set for the 10 second offset value associated with the BS1 DCD/UCD message broadcast reaches a point where it triggers the mobile station to come back to read the DCD/UCD transmission from base station BS1. Again, based on the scanned base stations that can provide the desired service information, the mobile station selects one of the base stations to "camp on" or adds one or more base stations to an active handover candidate set if the mobile station is involved in an active connection.

Three non-limiting example embodiments for an 802.16 implementation are now described. In a first one, information such as frame number, frame duration, and DCD-UCD-offset fields are sent just after the frame preamble. This information may be sent by modifying the current FCH in the 802.16e protocol, which has an advantage of further frame decoding required if the information is sent in the DL MAP/UL MAP. But an advantage with sending the information in the DL MAP/UL MAP is that frame number and frame duration are not needed as they are included in the current DL MAP. The DCD-UCD offset is the same for DCD and UCD, meaning that transmission of DCD and UCD is synchronized. For example, DCD and UCD are sent in the same frame.

In the existing 802.16e, the frame control header (FCH) has the following characteristics. The frame preamble is followed by the FCH over two symbols. The FCH is QPSK-modulated with a ½ FEC code rate, repeated four times, and sent on 4 sub-channels. Each sub-channel comprises 48 data sub-carrier over two symbols. Thus, the total available data sub-carriers for the FCH are 4*48=192 sub-carriers per segment. In 802.16e FCH is constructed as follows. The FCH contains the DL Frame Prefix (DLFP) which provides frame configuration information, such as tile modulation and coding scheme, the length of one or several DL bursts immediately following the FCH, and usable sub-carriers. The DLFP mapped on the FCH is shown in table 1 below.

TABLE 1

| FCH | DLFP | 24 bit |
|---|---|---|

The FCH is mapped as per the physical channel characteristic (modulation, repetition rate) on the total available resources of 192 subcarriers. The FCH is only 24 bits, and mapping it onto 192 subcarriers wastes resources because half of the resources (subcarriers) are never used. This example embodiment utilizes the FCH resources in two efficient ways. The first way is by transporting the 1-bit offset indicator and the 12-bit offset value by extending the reserved 4 bits. This adds 8 bits to the existing 24-bit FCH in 802.16e. This addition does not result in any additional resource cost because the total of 32 bits in the FCH can be easily constructed and fit into the existing available 192 subcarriers without modifying the FCH physical characteristics (modulation, repetition rate). This is shown in table 4a. The second way includes constructing frame number and frame duration information in the FCH instead of in the DL MAP. This avoids the need for the mobile station to read the DL MAP to detect the frame number and frame duration information, thereby saving more battery, and empowering the mobile station with additional physical synchronization information at no resource cost. The frame number and frame duration information can be easily constructed in the FCH and "fit" into the existing resources of 192 subcarriers simply by modifying the repetition rate from 4 to 3. This modification has no substantial performance impact because there is no significant gain in coverage for the repetition factor from 2 to 4. This is shown in Table 4b below.

Table 2 shows the details of the DLFP, a 24 bit data structure transmitted at the beginning of each frame. The 24 bit data is defined for various FFT sizes such as 512, 1024 and 2048. The repetition factor is four for the FCH with FFT sizes of 512, 1024 and 2048.

TABLE 2

| Syntax | Size (Bits) | Notes |
|---|---|---|
| DLFP( ) { | | |
| Used Sub-channel Bitmap | 6 | |
| Reserved | 1 | |
| Repetition Coding Indication | 2 | |
| Coding Indication | 3 | |
| DL MAP Length | 8 | |
| Reserved | 4 | |
| } | | |

In one example embodiment for the existing FCH for 802.16e, the 1 reserved bit and the 4 reserved bits in the existing DLFP (FCH) shown in Table 2 are used to convey the DCD-UCD frame-offset. Two non-limiting example ways for achieving this are now described. The first uses both reserved fields of DLFP. The first reserved bit is used as a DCD-UCD-frame-offset indicator to indicate whether this FCH includes a DCD/UCD message or not. If this bit is set, the DCD-UCD-offset is included. It is shown in following table 3.

TABLE 3

| DCD-UCD - frame-offset Indicator | 1 | To indicate whether frame information is included or not 0: Not included; 1: Included |
|---|---|---|

The additional 4 reserved bits (see Table 2 above) can be extended and used in combination with the Table 3 indicator as follows to provide the DCD/UCD-frame-offset and related information as shown in Table 4a.

TABLE 4a

| If (DCD-UCD-Frame-offset Indicator == 1) { | 1 bit |
|---|---|
| DCD-UCD-frame-offset | 11-bit |
| } | |

As described above the additional 4 reserved bits (see Table 2 above) can be extended and used in combination with the Table 3 indicator as follows to provide the DCD/UCD-frame-offset and related information as shown in Table 4b.

TABLE 4b

| If (DCD-UCD-Frame-offset Indicator == 1) { | 1 bit |
|---|---|
| Frame Number | 24 Bit |
| Frame Duration | 4-bit |
| DCD-UCD-frame-offset | 11-bit |
| } | |

For mobile stations with an old MAC version, the BS can keep all the reserved bits as '0 s.' For mobile's with a newer MAC version, the BS can enable the frame offset indicator. Thus, newer 16e mobiles can decode the new information sent in the reserved bits of the DLFP/FCH. A complete modified DLFP/FCH is shown in Table 5 below

TABLE 5

| Syntax | Size (Bits) | Notes |
|---|---|---|
| DLFP( ) { | | |
| Used Sub-channel Bitmap | 6 | |
| DCD-UCD-Frame-offset Indicator | 1 | Set to 1 or 0 |
| Repetition Coding Indication | 2 | |
| Coding Indication | 3 | |
| DL MAP Length | 8 | |
| If (DCD-UCD-Frame-offset Indicator == 1) { | 1 bit | |
| Frame Number | 24 bit | |
| Frame Duration | 4 bit | |
| DCD-UCD-frame-offset } | 11-bit | |

The second non-limiting example way only uses the 4 reserved bits of the DLFP field as shown in Table 6.

TABLE 6

| Syntax | Size (Bits) | Notes |
| --- | --- | --- |
| DLFP( ) { | | |
| Used Sub-channel Bitmap | 6 | |
| Reserved | 0 | |
| Repetition Coding Indication | 2 | |
| Coding Indication | 3 | |
| DL MAP Length | 8 | |
| DCD-UCD offset | 4 bit | |

In both cases, the DCD-UCD-offset can be represented with 4 bits or 16 values.

Table 7 gives an example of how the 4 bits can be used to define DCD-UCD-offset values. Another possibility is to use an exponential scale for the consecutive levels for the DCD-UCD-offsets, i.e. level_n=level_0*k^n. Both are just examples.

TABLE 7

| Number | Bits | DCD-UCD-offset t |
| --- | --- | --- |
| 0 | 0000 | $0 <= t <= 250$ ms |
| 1 | 0001 | $250$ ms $<= t <= 500$ ms |
| 2 | 0010 | $500$ ms $<= t <= 1$ s |
| 3 | 0011 | $1$ s $<= t <= 1.5$ s |
| 4 | 0100 | $1.5$ s $<= t <= 2$ s |
| 5 | 0101 | $2$ s $<= t <= 2.5$ s |
| 6 | 0110 | $2.5$ s $<= t <= 3$ s |
| 7 | 0111 | $3$ s $<= t <= 3.5$ s |
| 8 | 1000 | $3.5$ s $<= t <= 4$ s |
| 9 | 1001 | $4$ s $<= t <= 4.5$ s |
| 10 | 1010 | $4.5$ s $<= t <= 5$ s |
| 11 | 1011 | $5 <= t <= 6$ s |
| 12 | 1100 | $6 <= t <= 7$ s |
| 13 | 1101 | $7 <= t <= 8$ s |
| 14 | 1110 | $8 <= t <= 9$ s |
| 15 | 1111 | $9 <= t <= 10$ s |

A second non-limiting embodiment relates to a new FCH format for 802.16m. New information elements include a 24-bit frame number and 12-bit frame offset to cover a more than 10 second DCD-UCD interval. For 802.16e, only a 5 ms frame duration is provided with a code number 5. There are 8 bits set aside to represent the various frame durations such as 5 ms, 1 ms, etc. However, this is over-designed because 4 bits are sufficient to represent various frame durations. For 802.16m, the number of frame duration code could be a maximum of four, which means 4 bits are enough for 16 m systems and for backward compatibility. A new possible FCH structure includes fields as shown in Table 8 below.

TABLE 8

| New FCH | DLFP | 24 bits |
| --- | --- | --- |
| | Frame Number | 24 bits |
| | Frame Duration | 4 bits |
| | DCD-UCD-frame-offset | 12 bit |

Figure 11A:
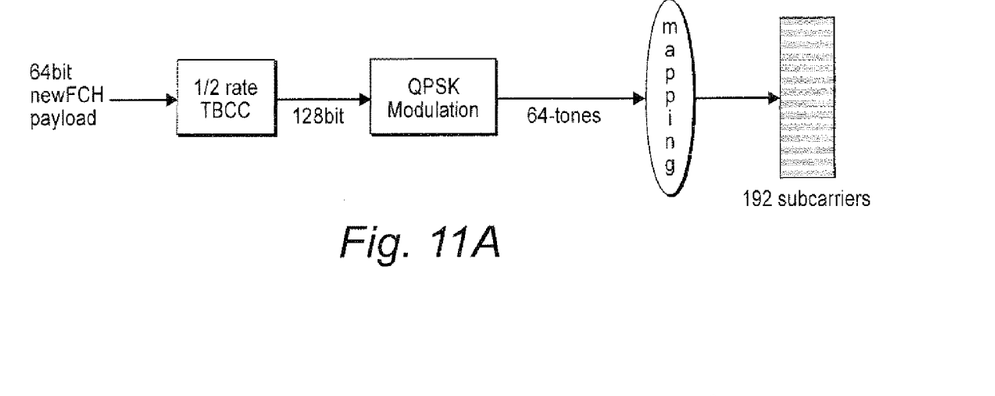
FIGS. 11A-11C are diagrams illustrating mapping of a modified 802.16e frame control header onto OFDM subcarriers in an 802.16e system.
Figure 11B:
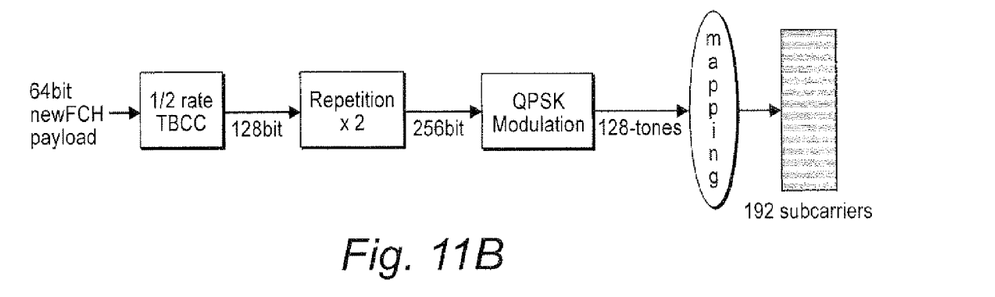
Figure 11C:
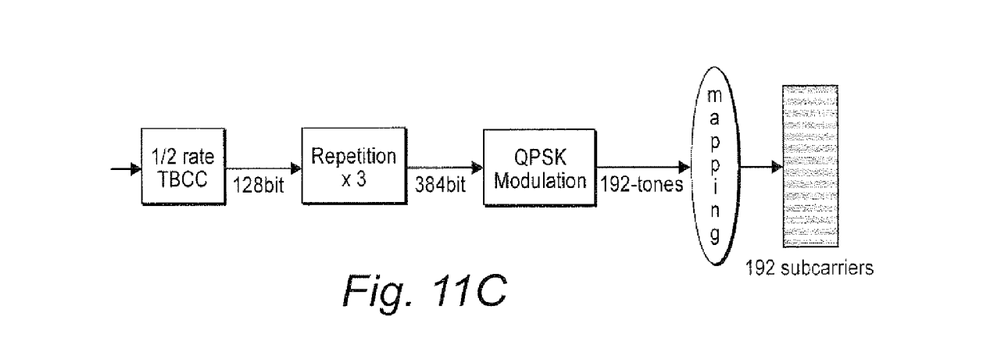

FIGS. 11A-11C are now described to explain the 24-bit FCH mapping on 192 OFDM subcarriers with and without repetition respectively. FIGS. 11A and 11B show how the new FCH frame structure may be adopted without having to change the OFDM subcarrier resources (four sub-channels, PUSC node) allocated to the FCH payload. The new FCH payload includes 64 bits (24+24+4+12=64). A ½ rate tail biting convolutional code (TBCC) is applied to encode the payload to generate 128 bits, which are QPSK modulated into 64 tones to be mapped onto the 192 available subcarriers. There is no repetition in FIG. 11A. In FIG. 11B, the TBCC output is repeated twice to generate 256 bits which are QPSK modulated into 128 tones that are mapped onto 192 subcarriers. FIG. 11C shows the TBCC output is repeated three times to generate 384 bits which are QPSK modulated into 192 tones that can be mapped onto 192 subcarriers. Although four repetitions are not possible to map onto 192 subcarriers, the impact is minimal. There no significant diversity gains from 2 repetitions to 4 repetitions, and 3 repetitions for the new FCH format allows for efficient radio resource (sub carriers) use. However, 2 repetitions are also feasible.

In a third non-limiting example embodiment, the DCD/UCD-frame-offset information is sent just after the frame preamble by modifying the DL MAP. Frame number and frame duration are not needed as they are included in the current DL MAP. An additional 12-bit DCD/UCD-frame-offset field can be sent, for example, in the physical synchronization field of DL MAP as a separate element or as a part of reserved bits associated with a 'frame duration field' (any reserved bits from 9 to 255 to indicate the DCD-UCD frame offset). Alternatively, a separate information element (IE) may be specified in the DL MAP after the physical synchronization field of DL MAP. Once this information is acquired, the mobile station can stop decoding of the rest of the DL MAP if appropriate based on DCD-UCD-frame offset value.

In the example of sending the DCD-UCD-offset value using the physical synchronization field of the DL MAP, the reserved 8 bit values from 9 to 26 (out of 9 to 255) can be used to represent the DCD-UCD offset as shown in Table 9 below. Another possibility is to use an exponential scale for the consecutive levels for the DCD-UCD-offsets, i.e. level_n=level_0*k^n. Both are just examples.

TABLE 9

| Number | Bits | DCD-UCD-offset t |
| --- | --- | --- |
| 9 | 00001001 | $0 <= t <= 250$ ms |
| 10 | 00001010 | $250$ ms $<= t <= 500$ ms |
| 11 | 00001011 | $500$ ms $<= t <= 1$ s |
| 12 | 00001100 | $1$ s $<= t <= 1.5$ s |
| 13 | 00001101 | $1.5$ s $<= t <= 2$ s |
| 14 | 00001110 | $2$ s $<= t <= 2.5$ s |
| 15 | 00001111 | $2.5$ s $<= t <= 3$ s |
| 16 | | $3$ s $<= t <= 3.5$ s |
| 17 | | $3.5$ s $<= t <= 4$ s |
| 18 | | $4$ s $<= t <= 4.5$ s |
| 19 | . | $4.5$ s $<= t <= 5$ s |
| 20 | . | $5 <= t <= 6$ s |
| 21 | . | $6 <= t <= 7$ s |
| 22 | | $7 <= t <= 8$ s |
| . | | $8 <= t <= 9$ s |
| 26 | | $9 <= t <= 10$ s |

The example 802.16 related embodiments reduce base station locking time during scanning and hence speed up the scanning cell search procedure. This also results in reduced battery consumption at the mobile station. The new FCH structure embodiment has advantages over the embodiment using the DL MAP including avoiding having to receive and decode the DL MAP, faster network entry procedure, reduction in mobile power consumption, and efficient use of radio resources for the FCH.

An active mode mobile station may also align and link the broadcast time indicator with the scheduled traffic from its own serving base station (BS) and adapt its scanning interval for further performance gain. The mobile station sends a request to the serving base station for specific scanning interval gaps when the mobile station can scan other base stations for handover purposes. The serving base station grants the mobile's request in a response message. When the serving base station schedules the scanning interval for the mobile station, it stores traffic packets intended for that mobile station that arrive from upper protocol layers during the time interval when the mobile station is scanning base stations. For the example uses above, a maximum scanning interval per BS for a mobile station is 10 seconds. For "in" base stations, this amounts to a total scanning time of n×10 seconds, which requires the base station to buffer n×10 seconds of traffic to be transmitted to the mobile station. By considering the values of broadcast service time indicators from scanned base stations, the mobile station can make intelligent requests for scanning interval gaps in traffic transmission from the base station that coincide with the times when the scanned base stations will be broadcasting their service information. In this way, the mobile station can greatly reduce the traffic interruptions and the buffering at the serving base station, which improves quality of service (QoS). For example, if the serving base station instructs the mobile station to scan three base stations, and if the mobile station determines in a first scan from detected timing indicators from the three scanned base stations that the arrival of the broadcast service information (e.g., DCD/UCD) For these three base stations is 6 sec, 7 sec, and 10 sec away from the current time, respectively, then the mobile station requests the scanning gaps to coincide with these three times so that traffic transmission may occur at other times. The reduces the interruption gaps and the number of scanning intervals resulting in improved QoS.

In general, the technology described in this application improves the system performance without having to increase the periodicity of the broadcast service information. Additionally, it allows for improved the handover performance, improved network entry performance by reducing the mobile station locking time to each scanned base station, and reduced broadcast service information waiting time during the base station scanning process. This allows a mobile station to sleep and wake up in time to read the broadcast service information thereby saving the power and increasing battery life. The technology allows a mobile station in a network entry mode to wait, sleep, and/or scan other base stations until the mobile can select the cell that meets its requirements, thus improving the end user perception and quality of service. The technology also enhances the performance of the active mode mobile station in terms of overall system resource optimization, QoS, and buffer requirements.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a base station for communicating with mobile radio devices in a cellular radio communication system, the method comprising:
   transmitting in a cell associated with the base station a known symbol sequence over a broadcast channel to permit mobile radios to detect and synchronize to the base station;
   transmitting a time indicator indicating when the base station will transmit service information from which a mobile radio may determine whether the base station can provide a desired communications service;
   after a time period associated with the time indicator, transmitting the service information, the method further comprising:
   receiving from the mobile radio device operating in an active mode a request to align one or more base station scanning interval gaps in transmissions from the base station to the mobile radio device with times when other base stations being scanned by the mobile radio device are broadcasting broadcast service information; and
   granting the request.

2. The method in claim 1, wherein the cellular radio communication system supports one or more IEEE 802.16 standards.

3. The method in claim 1, wherein the service information includes system information and cell-specific information.

4. The method in claim 3, wherein the service information includes a network identifier identifying a network to which the base station belongs, a base station identifier, information for sending uplink communications from a mobile radio to the base station, supported frequency bands, a transmit power profile, and a paging area identifier.

5. The method in claim 1, wherein:
   the known symbol sequence is a preamble provided in a frame of information transmitted by the base station, and
   the frame further includes a frame control header, and the time indicator is included in the frame control header.

6. The method in claim 5, wherein only periodic frames include the service information.

7. The method in claim 6, wherein the service information is included in a downlink channel descriptor (DCD)/uplink channel descriptor (UCD).

8. The method in claim 7, wherein the time indicator is a DCD/UCD offset defining an offset from a current time to the next time the base station will transmit the DCD/UCD.

9. The method in claim 8, wherein the time indicator includes a bit to indicate whether a DCD/UCD offset is included in the current frame and multiple other bits to define the DCD/UCD offset amount if a DCD/UCD offset is included in the current frame.

10. The method in claim 8, wherein the time indicator includes multiple bits to define the DCD/UCD offset amount if a DCD/UCD offset is included in the current frame.

11. The method in claim 8, wherein the frame control header includes frame number and frame duration information in addition to the DCD/UCD offset.

12. The method in claim 1, wherein the service information is included in a downlink media access protocol (MAP) portion of the frame.

13. The method in claim 12, wherein the service information is included in a synchronization field in the downlink MAP portion of the frame or as a separate information element in the downlink MAP portion of the frame.

14. The method in claim 1, wherein the time indicator is constructed in the base station or a node communicating with the base station.

15. A method implemented in a mobile radio device for communicating in a cellular radio communication system that includes multiple base stations, each base station transmitting system information to multiple mobile radio devices, the method comprising:
- scanning for and detecting a broadcast signal from a base station;
- decoding the broadcast signal and detecting a time period associated with receiving broadcast information from the base station from which the mobile radio devices may determine whether the base station can provide a desired communications service;
- based on the time period, halting further decoding of the broadcast signal; and
- resuming decoding of the broadcast signal in accordance with the time period and acquiring the broadcast information from the broadcast signal, the method further comprising:
- scanning for and detecting one or more other base station signals broadcast by one or more other base stations after halting decoding of the broadcast signal,
- resuming decoding of the broadcast signal at a time when the broadcast information is expected to be received by the mobile radio, and
- wherein when the mobile radio device is in an active mode and acquires one or more time indicators, sending a request to a serving base station to align one or more base station scanning interval gaps in transmissions from the serving base station to the mobile radio device with times when scanned other base stations are broadcasting broadcast service information.

16. The method in claim 15, further comprising:
- moving to a battery conserving state for at least a portion of time after halting decoding of the broadcast signal, and
- leaving the battery conserving state to a more active state to resume decoding of the broadcast signal at a time when the broadcast information is expected to be received by the mobile radio.

17. The method in claim 15, further comprising:
- after halting decoding of the broadcast signal, scanning and detecting one or more other base station signals broadcast by one or more other base stations, and
- resuming decoding of the broadcast signal at a time when the broadcast information is expected to be received by the mobile radio.

18. The method in claim 15, further comprising:
- selecting one of the base stations to obtain the desired communications service.

19. The method in claim 15, wherein the cellular radio communication system supports one or more IEEE 802.16 standards.

20. The method in claim 15, wherein the service information also includes a network identifier identifying a network to which the base station belongs, a base station identifier, and information for sending uplink communications from a mobile radio to the base station.

21. The method in claim 15, wherein:
- a known symbol sequence is provided in a frame of information transmitted by the base station,
- the frame further includes a frame control header and the time indicator is included in the frame control header, and
- only periodic ones of the frames include the service information.

22. The method in claim 21, wherein the service information is included in a downlink channel descriptor (DCD)/uplink channel descriptor (UCD) and the time indicator is a DCD/UCD offset defining an offset from a current time to the next time the base station will transmit the DCD/UCD.

23. The method in claim 22, wherein the time indicator includes a bit to indicate whether a DCD/UCD offset is included in the current frame and multiple other bits to define the DCD/UCD offset amount if a DCD/UCD offset is included in the current frame.

24. The method in claim 22, wherein the time indicator includes multiple bits to define the DCD/UCD offset amount if a DCD/UCD offset is included in the current frame.

25. The method in claim 22, wherein the frame control header includes frame number and frame duration information in addition to the DCD/UCD offset.

26. The method in claim 15, wherein the service information is included in a downlink media access protocol (MAP) portion of the frame.

27. The method in claim 26, wherein the service information is included in a synchronization field in the downlink MAP portion of the frame or as a separate information element in the downlink MAP portion of the frame.

28. Apparatus in a base station for communicating with mobile radio devices in a cellular radio communication system, comprising:
- a radio transmitter;
- control circuitry for providing information to be transmitted by the radio transmitter,
- wherein the radio transmitter is configured to:
  - transmit in a cell associated with the base station a known symbol sequence over a broadcast channel to permit mobile radios to detect and synchronize to the base station;
  - transmit a time indicator indicating when the base station will transmit service information from which a mobile radio may determine whether the base station can provide a desired communications service; and
  - after a time period associated with the time indicator, transmit the service information,
- a radio receiver for receiving from the mobile radio device a request to align one or more base station scanning interval gaps in transmissions from the base station to the mobile radio device with times when other base stations being scanned by the mobile radio device are broadcasting broadcast service information,
- wherein the transmitter is configured to transmit a grant of the request.

29. The apparatus in claim 28, wherein the cellular radio communication system supports one or more IEEE 802.16 standards.

30. The apparatus in claim 28, wherein the service information includes a network identifier identifying a network to which the base station belongs, a base station identifier, information for sending uplink communications from a mobile radio to the base station, supported frequency bands, a transmit power profile, and a paging area identifier.

31. The apparatus in claim 28, wherein:
- a known symbol sequence is a preamble provided in a frame of information transmitted by the base station,
- the frame further includes a frame control header,
- the time indicator is included in the frame control header, and
- only periodic ones of the frames include the service information.

32. The apparatus in claim 31, wherein:
- the service information is included in a downlink channel descriptor (DCD)/uplink channel descriptor (UCD), and the time indicator is a DCD/UCD offset defining an offset from a current time to the next time the base station will transmit the DCD/UCD.

33. The apparatus in claim 31, wherein the time indicator includes a bit to indicate whether a DCD/UCD offset is included in the current frame and multiple other bits to define the DCD/UCD offset amount if a DCD/UCD offset is included in the current frame.

34. The apparatus in claim 31, wherein the time indicator includes multiple bits to define the DCD/UCD offset amount if a DCD/UCD offset is included in the current frame.

35. The apparatus in claim 31, wherein, wherein the frame control header includes frame number and frame duration information in addition to the DCD/UCD offset.

36. The apparatus in claim 28, wherein the service information is included in a downlink media access protocol (MAP) portion of the frame.

37. Apparatus in a mobile radio device for communicating in a cellular radio communication system that includes multiple base stations, each base station transmitting system information to multiple mobile radio devices, the apparatus comprising:
scanning circuitry that scans for and detects a broadcast signal from a base station;
decoding circuitry that decodes the broadcast signal and detects a time indicator associated with receiving broadcast service information from the base station from which the mobile radio devices may determine whether the base station can provide a desired communications service; and
control circuitry configured to halt the decoding circuitry's further decoding of the broadcast signal based on the time indicator and to have the decoding circuitry resume decoding of the broadcast signal in accordance with the time indicator and acquiring the broadcast information from the broadcast signal,
wherein the scanning circuitry is configured to scan and detect one or more other base station signals broadcast by one or more other base stations after halting decoding of the broadcast signal,
wherein the decoding circuitry is configured to resume decoding of the broadcast signal at a time when the broadcast information is expected to be received by the mobile radio, and
wherein when the mobile radio device is in an active mode, the mobile radio device, after acquiring one or more time indicators, sends a request to a serving base station to align one or more base station scanning interval gaps in transmissions from the serving base station to the mobile radio device with times when scanned other base stations are broadcasting broadcast service information.

38. The apparatus in claim 37, wherein the mobile radio device is battery-operated and the control circuitry is configured to move the mobile radio device into a battery conserving state for at least a portion of time after halting decoding of the broadcast signal and to leave the battery conserving state to enter a more active state to resume decoding of the broadcast signal at a time when the broadcast information is expected to be received by the mobile radio.

39. The apparatus in claim 37, wherein the cellular radio communication system supports one or more IEEE 802.16 standards.

40. The apparatus in claim 39, wherein:
a known symbol sequence is provided in a frame of information transmitted by the base station,
the frame further includes a frame control header,
the time indicator is included in the frame control header,
the service information is included in a downlink channel descriptor (DCD)/uplink channel descriptor (UCD), and
the time indicator is a DCD/UCD offset defining an offset from a current time to the next time the base station will transmit the DCD/UCD.

41. The apparatus in claim 40, wherein the time indicator includes a bit to indicate whether a DCD/UCD offset is included in the current frame and multiple other bits to define the DCD/UCD offset amount if a DCD/UCD offset is included in the current frame.

42. The apparatus in claim 40, wherein the time indicator includes multiple bits to define the DCD/UCD offset amount if a DCD/UCD offset is included in the current frame.

43. The apparatus in claim 40, wherein the frame control header includes frame number and frame duration information in addition to the DCD/UCD offset.

44. The apparatus in claim 37, wherein the service information is included in a downlink media access protocol (MAP) portion of the frame.

* * * * *